US012645071B2

(12) United States Patent
Kirillov

(10) Patent No.: US 12,645,071 B2
(45) Date of Patent: Jun. 2, 2026

(54) LIGHT DIFFUSER FOR LASER BEAM SCANNING DISPLAY

(71) Applicant: Infineon Technologies AG, Neubiberg (DE)

(72) Inventor: Boris Kirillov, Gratwein-Straßengel (AT)

(73) Assignee: Infineon Technologies AG, Neubiberg (DE)

( * ) Notice: Subject to any disclaimer, the term of this patent is extended or adjusted under 35 U.S.C. 154(b) by 554 days.

(21) Appl. No.: 18/184,811

(22) Filed: Mar. 16, 2023

(65) Prior Publication Data

US 2024/0310623 A1     Sep. 19, 2024

(51) Int. Cl.
*G02B 26/08*     (2006.01)
*G02B 3/00*     (2006.01)
*G02B 26/10*     (2006.01)

(52) U.S. Cl.
CPC ......... *G02B 26/101* (2013.01); *G02B 3/0056* (2013.01); *G02B 26/105* (2013.01)

(58) Field of Classification Search
CPC .. G02B 26/101; G02B 3/0056; G02B 26/105; G02B 2027/0118; G02B 27/0101; G02B 27/48; G02B 27/0961
See application file for complete search history.

(56) References Cited

U.S. PATENT DOCUMENTS

2018/0113240 A1     4/2018   Watanabe et al.
2020/0301138 A1*   9/2020   Ogino .................... B60K 35/22

FOREIGN PATENT DOCUMENTS

CN       114690520 A     7/2022
EP        2916149 A1     9/2015
EP        4020058 A1     6/2022
JP        2015-172763 A    10/2015
KR       101762063 B1     7/2017

* cited by examiner

*Primary Examiner* — Euncha P Cherry
(74) *Attorney, Agent, or Firm* — Harrity & Harrity, LLP

(57)     ABSTRACT

A light beam scanning system includes a light transmitter configured to generate pixel light beams corresponding to an image and transmit the pixel light beams on an optical path; a two-dimensional (2D) scanner arranged on the optical path and configured steer the pixel light beams according to a 2D scanning pattern; a diffuser screen arranged on the optical path downstream from the 2D scanner and configured to expand a beam width of each pixel light beam of the plurality of pixel light beams to generate divergent pixel light beams, wherein the diffuser screen includes a microlens array having a plurality of microlenses arranged in a 2D array; and a controller configured to synchronize transmission times of the plurality of pixel light beams with a movement of the 2D scanner such that trajectories of the plurality of pixel light beams are matched with a geometry of the microlens array.

13 Claims, 9 Drawing Sheets

200

210

400

210

Pixel Light Beam

400

700

700

LIGHT DIFFUSER FOR LASER BEAM SCANNING DISPLAY

BACKGROUND

Augmented reality (AR) is a technology that provides an interactive user-experience that combines real-world and computer-generated content. AR delivers visual elements, sound, haptics, and/or other sensory information to a user in order to alter the user's ongoing perception of a real-world environment in real-time. In other words, AR adds digital elements to a live experience of the real-world environment. The sensory information overlaid with the real-world environment can be constructive in order to add the sensory information to the real-world environment or destructive in order to mask part of the real-world environment. The sensory information may be delivered to the user through a device, such as a mobile device. For example, a perceived part of the real-world environment may be augmented with digital information that is superimposed thereon. In some cases, visual content may be superimposed onto the user's line-of-sight (e.g., a user's real-world view). Thus, digital content may be overlaid onto the perceived part of the environment to visually provide additional information to the user. The digital content may be displayed on a transparent substrate or display, such as smart eye-glasses, smart contact lenses, head-up displays (HUDs), and head-mounted displays (HMDs), or projected directly onto a user's retina, as is the case for virtual retinal displays.

Virtual reality (VR) is a technology that creates a totally artificial, computer-generated environment in which a user is immersed. Thus, the user's perception of reality is completely based on virtual information. The user may experience a virtually rendered environment with sight and sound through a VR headset or a multi-projected environment. For example, computer-generated stereo visuals may place the user into the virtually rendered environment that provides the user with an immersive feel that is intended to simulate sensations that the user would otherwise experience in the real-world.

A mixed reality (MR) experience combines elements of both AR and VR such that real-world and digital objects interact in real time. MR may allow real and virtual elements to interact with one another and the user to interact with the virtual elements like they would in the real-world. Here, a real-world environment is blended with a virtual environment. Since MR maintains a connection to the real-world, MR is not considered a fully-immersive experience like VR. The user may experience an MR environment using an MR headset or MR glasses.

These technologies, as well as others that enhance a user's senses, may be referred to as extended reality (XR) technologies.

SUMMARY

In some implementations, a light beam scanning system includes a light transmitter configured to generate a plurality of pixel light beams corresponding to an image and transmit the plurality of pixel light beams on an optical path; a two-dimensional (2D) scanner arranged on the optical path, wherein the 2D scanner is configured to receive the plurality of pixel light beams from the light transmitter and steer the plurality of pixel light beams along the optical path according to a 2D scanning pattern; a diffuser screen arranged on the optical path downstream from the 2D scanner, wherein the diffuser screen is configured to receive the plurality of pixel light beams from the 2D scanner and expand a beam width of each pixel light beam of the plurality of pixel light beams to generate a plurality of divergent pixel light beams, wherein the 2D scanner is configured to scan the plurality of pixel light beams onto the diffuser screen according to the 2D scanning pattern, and wherein the diffuser screen comprises a microlens array comprising a plurality of microlenses arranged in a 2D array; and a controller configured to synchronize transmission times of the plurality of pixel light beams with a movement of the 2D scanner such that trajectories of the plurality of pixel light beams are matched with a geometry of the microlens array, wherein the trajectories of the plurality of pixel light beams are matched with the geometry of the microlens array such that each pixel light beam is incident on only a single microlens of the plurality of microlenses.

In some implementations, a light beam scanning system includes a light transmitter configured to generate a plurality of pixel light beams corresponding to an image and transmit the plurality of pixel light beams on an optical path; a 2D scanner arranged on the optical path, wherein the 2D scanner is configured to receive the plurality of pixel light beams from the light transmitter and steer the plurality of pixel light beams along the optical path according to a 2D scanning pattern; and a diffuser screen arranged on the optical path downstream from the 2D scanner, wherein the diffuser screen is configured to receive the plurality of pixel light beams from the 2D scanner and expand a beam width of each pixel light beam of the plurality of pixel light beams to generate a plurality of divergent pixel light beams, wherein the 2D scanner is configured to scan the plurality of pixel light beams onto the diffuser screen according to the 2D scanning pattern, wherein the diffuser screen comprises a microlens array comprising a plurality of microlenses arranged in a first 2D array, wherein the diffuser screen comprises a polarization mask comprising a polarization array, wherein the polarization array comprises a plurality of polarization components arranged in a second 2D array that is matched with the first 2D array, wherein the plurality of polarization components comprises a first subset of polarization components each having a first polarization and a second subset of polarization components each having a second polarization that is perpendicular to the first polarization, and wherein the first subset of polarization components and the second subset of polarization components are intermixed in a checkered pattern.

In some implementations, a light beam scanning system includes a light transmitter configured to generate a plurality of pixel light beams corresponding to an image and transmit the plurality of pixel light beams on an optical path; a 2D scanner arranged on the optical path, wherein the 2D scanner is configured to receive the plurality of pixel light beams from the light transmitter and steer the plurality of pixel light beams along the optical path according to a 2D scanning pattern; and a diffuser screen arranged on the optical path downstream from the 2D scanner, wherein the diffuser screen is configured to receive the plurality of pixel light beams from the 2D scanner and expand a beam width of each pixel light beam of the plurality of pixel light beams to generate a plurality of divergent pixel light beams, wherein the 2D scanner is configured to scan the plurality of pixel light beams onto the diffuser screen according to the 2D scanning pattern, wherein the diffuser screen comprises a microlens array comprising a plurality of microlenses arranged in a 2D array, wherein the plurality of microlenses comprises a first subset of microlenses each associated with a first optical path length and a second subset of microlenses each associated with a second optical path length that is different from the first optical path length, and wherein the first subset of microlenses and the second subset of microlenses are intermixed in a checkered pattern.

BRIEF DESCRIPTION OF THE DRAWINGS

Implementations are described herein making reference to the appended drawings.

DETAILED DESCRIPTION

Figure 1A:
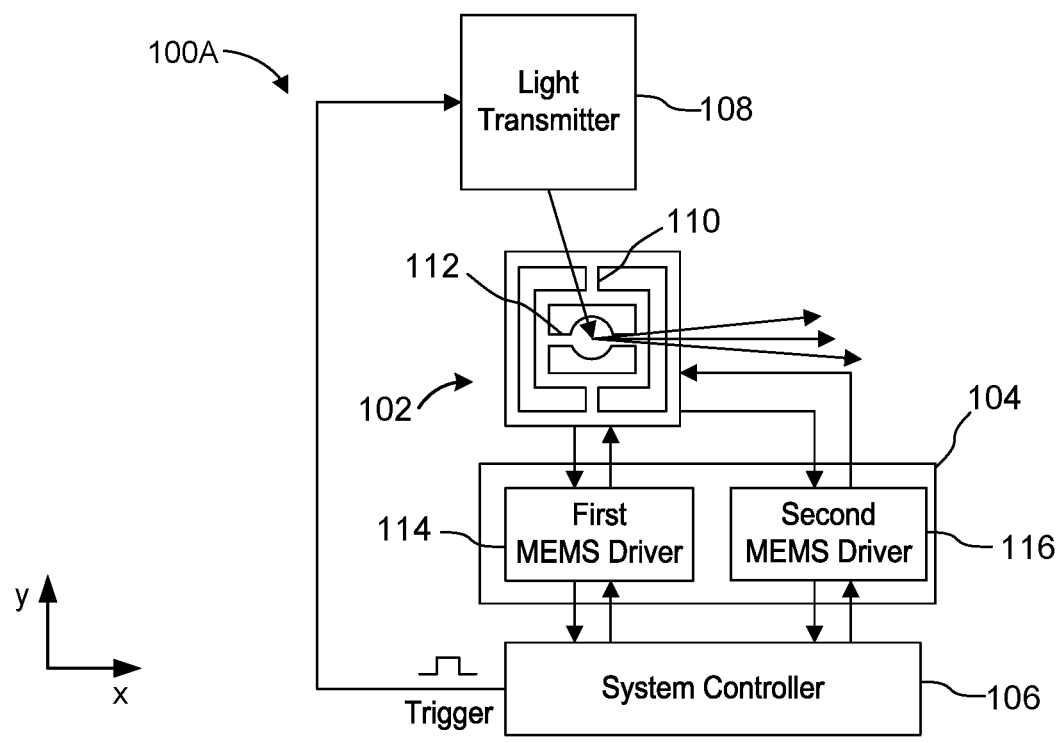
FIG. 1A is a schematic block diagram of a 2D scanning system according to one or more implementations.

In the following, details are set forth to provide a more thorough explanation of example implementations. However, it will be apparent to those skilled in the art that these implementations may be practiced without these specific details. In other instances, well-known structures and devices are shown in block diagram form or in a schematic view rather than in detail in order to avoid obscuring the implementations. In addition, features of the different implementations described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

Each of the illustrated x-axis, y-axis, and z-axis is substantially perpendicular to the other two axes. In other words, the x-axis is substantially perpendicular to the y-axis and the z-axis, the y-axis is substantially perpendicular to the x-axis and the z-axis, and the z-axis is substantially perpendicular to the x-axis and the y-axis. In some cases, a single reference number is shown to refer to a surface, or fewer than all instances of a part may be labeled with all surfaces of that part. All instances of the part may include associated surfaces of that part despite not every surface being labeled.

The orientations of the various elements in the figures are shown as examples, and the illustrated examples may be rotated relative to the depicted orientations. The descriptions provided herein, and the claims that follow, pertain to any structures that have the described relationships between various features, regardless of whether the structures are in the particular orientation of the drawings, or are rotated relative to such orientation. Similarly, spatially relative terms, such as "top," "bottom," "below," "beneath," "lower," "above," "upper," "middle," "left," and "right," are used herein for ease of description to describe one element's relationship to one or more other elements as illustrated in the figures. The spatially relative terms are intended to encompass different orientations of the element, structure, and/or assembly in use or operation in addition to the orientations depicted in the figures. A structure and/or assembly may be otherwise oriented (rotated 90 degrees or at other orientations), and the spatially relative descriptors used herein may be interpreted accordingly. Furthermore, the cross-sectional views in the figures only show features within the planes of the cross-sections, and do not show materials behind the planes of the cross-sections, unless indicated otherwise, in order to simplify the drawings.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In implementations described herein or shown in the drawings, any direct electrical connection or coupling, e.g., any connection or coupling without additional intervening elements, may also be implemented by an indirect connection or coupling, e.g., a connection or coupling with one or more additional intervening elements, or vice versa, as long as the general purpose of the connection or coupling, for example, to transmit a certain kind of signal or to transmit a certain kind of information, is essentially maintained. Features from different implementations may be combined to form further implementations. For example, variations or modifications described with respect to one of the implementations may also be applicable to other implementations unless noted to the contrary.

As used herein, the terms "substantially" and "approximately" mean "within reasonable tolerances of manufacturing and measurement." For example, the terms "substantially" and "approximately" may be used herein to account for small manufacturing tolerances or other factors (e.g., within 5%) that are deemed acceptable in the industry without departing from the aspects of the implementations described herein. For example, a resistor with an approximate resistance value may practically have a resistance within 5% of the approximate resistance value. As another example, an approximate signal value may practically have a signal value within 5% of the approximate signal value.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

A head-up display (HUD), sometimes referred to as a heads-up display, is any transparent display that presents data without requiring users to look away from their usual viewpoints. For example, a HUD may be used in a vehicle to display images on a windshield. A diffuser screen in a laser beam scanning system, such as a HUD display system, may be used to expand a beam width of the laser beams to produce expanded laser beams. As a result, a size of an eyebox (e.g., a size of an area at which a projected image can be perceived by a user) may be increased. The diffuser screen may include a microlens array, with each microlens of the microlens array corresponding to one pixel of the projected image. During a scanning operation, a laser beam may be incident on two or more neighboring microlenses of the microlens array, which may result in a light interference between light projected from the two or more neighboring microlenses. The light interference may cause a brightness variation across the eyebox resultant from, for example, speckle noise, a Moire pattern, Newton rings, or another type of interference pattern. As a result, a quality of the projected image may decrease to an unacceptable level.

Some implementations disclosed herein are directed to an image projection system that reduces or prevents light interference of neighboring pixels in order to prevent brightness variations across a projected image (e.g., across an eyebox of a HUD system).

FIG. 1A is a schematic block diagram of a 2D scanning system 100A according to one or more implementations. In particular, the 2D scanning system 100A includes a microelectromechanical system (MEMS) mirror 102 implemented as a single scanning structure that is configured to steer or otherwise deflect light beams according to a 2D scanning pattern. The 2D scanning pattern has a pattern variation in a first dimension and a pattern variation in a second dimension. The 2D scanning system 100A further includes a MEMS driver system 104, a system controller 106, and a light transmitter 108.

In the example shown in FIG. 1A, the MEMS mirror 102 is a mechanical moving mirror (e.g., a MEMS micro-mirror) integrated on a semiconductor chip (not shown). The MEMS mirror 102 is configured to rotate or oscillate via rotation about two scanning axes that are typically orthogonal to each other. For example, the two scanning axes may include a first scanning axis 110 that enables the MEMS mirror 102 to steer light in a first scanning direction (e.g., an x-direction) and a second scanning axis 112 that enables the MEMS mirror 102 to steer light in a second scanning direction (e.g., a y-direction). As a result, the MEMS mirror 102 can direct light beams in two dimensions according to the 2D scanning pattern and may be referred to as a 2D MEMS mirror.

A scan can be performed to illuminate an area referred to as a field of view. The scan, such as an oscillating horizontal scan (e.g., from left to right and right to left of a field of view), an oscillating vertical scan (e.g., from bottom to top and top to bottom of a field of view), or a combination thereof (e.g., a Lissajous scan or a raster scan) can illuminate the field of view in a continuous scan fashion. In some implementations, the 2D scanning system 100A may be configured to transmit successive light beams, for example, as successive light pulses, in different scanning directions to scan the field of view. In other words, the field of view can be illuminated by a scanning operation. In general, an entire field of view represents a scanning area defined by a full range of motion of the MEMS mirror 102 at which the MEMS mirror 102 is driven. Thus, the entire field of view is delineated by a left edge, a right edge, a bottom edge, and a top edge. The entire field of view can also be referred to as a field of illumination or as a projection area in a projection plane onto which an image is projected.

The MEMS mirror 102 can direct a transmitted light beam at a desired 2D coordinate (e.g., an x-y coordinate) in the field of view. In image projection systems, the desired 2D coordinate may correspond to an image pixel of a projected image, with different 2D coordinates corresponding to different image pixels of the projected image. Accordingly, multiple light beams transmitted at different transmission times can be steered by the MEMS mirror 102 at the different 2D coordinates of the field of view in accordance with the 2D scanning pattern. The MEMS mirror 102 can be used to scan the field of view in both scanning directions by changing an angle of deflection of the MEMS mirror 102 on each of the first scanning axis 110 and the second scanning axis 112.

A rotation of the MEMS mirror 102 on the first scanning axis 110 may be performed between two predetermined extremum deflection angles (e.g., +/−5 degrees, +/−15 degrees, etc.). Likewise, a rotation of the MEMS mirror 102 on the second scanning axis 112 may be performed between two predetermined extremum deflection angles (e.g., +/−5 degrees, +/−15 degrees, etc.). In some implementations, depending on the 2D scanning pattern, the two predetermined extremum deflection angles used for the first scanning axis 110 may be the same as the two predetermined extremum deflection angles used for the second scanning axis 112. In some implementations, depending on the 2D scanning pattern, the two predetermined extremum deflection angles used for the first scanning axis 110 may be different from the two predetermined extremum deflection angles used for the second scanning axis 112.

In some implementations, the MEMS mirror 102 can be a resonator (e.g., a resonant MEMS mirror) configured to oscillate side-to-side about the first scanning axis 110 at a first frequency (e.g., a first resonance frequency) and configured to oscillate side-to-side about the second scanning axis 112 at a second frequency (e.g., a second resonance frequency). Thus, the MEMS mirror 102 can be continuously driven about the first scanning axis 110 and the second scanning axis 112 to perform a continuous scanning operation. As a result, light beams reflected by the MEMS mirror 102 are scanned into the field of view in accordance with the 2D scanning pattern.

Different frequencies or a same frequency may be used for the first scanning axis 110 and the second scanning axis 112 for defining the 2D scanning pattern. For example, a raster scanning pattern or a Lissajous scanning pattern may be achieved by using different frequencies for the first frequency and the second frequency. Raster scanning and Lissajous scanning are two types of scanning that can be implemented in display applications, light scanning applications, and light steering applications, to name a few. As an example, Lissajous scanning is typically performed using two resonant scanning axes which are driven at different constant scanning frequencies with a defined fixed frequency ratio therebetween that forms a specific Lissajous pattern and frame rate. In order to properly carry out the Lissajous scanning and the raster scanning, synchronization of the two scanning axes is performed by the system controller 106 in conjunction with transmission timings of the light transmitter 108.

For each respective scanning axis, including the first scanning axis 110 and the second scanning axis 112, the MEMS mirror 102 includes an actuator structure used to drive the MEMS mirror 102 about the respective scanning axis. Each actuator structure may include interdigitated finger electrodes made of interdigitated mirror combs and frame combs to which a drive voltage (e.g., an actuation signal or driving signal) is applied by the MEMS driver system 104. Applying a difference in electrical potential between interleaved mirror combs and frame combs creates a driving force between the mirror combs and the frame combs, which creates a torque on a mirror body of the MEMS mirror 102 about the intended scanning axis. The drive voltage can be toggled between two voltages, resulting in an oscillating driving force. The oscillating driving force causes the MEMS mirror 102 to oscillate back and forth on the respective scanning axis between two extrema. Depending on the configuration, this actuation can be regulated or adjusted by adjusting the drive voltage off time, a voltage level of the drive voltage, or a duty cycle.

In other examples, the MEMS mirror 102 may use other actuation methods to drive the MEMS mirror 102 about the respective scanning axes. For example, these other actuation methods may include electromagnetic actuation and/or piezoelectric actuators. In electromagnetic actuation, the MEMS mirror 102 may be immersed in a magnetic field, and an alternating electric current through conductive paths may create the oscillating torque around the scanning axis. Piezo-electric actuators may be integrated in leaf springs of the MEMS mirror 102, or the leaf springs may be made of piezoelectric material to produce alternating beam bending forces in response to an electrical signal to generate the oscillation torque.

The MEMS driver system 104 is configured to generate driving signals (e.g., actuation signals) to drive the MEMS mirror 102 about the first scanning axis 110 and the second scanning axis 112. In particular, the MEMS driver system 104 is configured to apply the driving signals to the actuator structure of the MEMS mirror 102. In some implementations, the MEMS driver system 104 includes a first MEMS driver 114 configured to drive the MEMS mirror 102 about the first scanning axis 110 and a second MEMS driver 116 configured to drive the MEMS mirror 102 about the second scanning axis 112. In implementations in which the MEMS mirror 102 is used as an oscillator, the first MEMS driver 114 configured to drive an oscillation of the MEMS mirror 102 about the first scanning axis 110 at the first frequency, and the second MEMS driver 116 is configured to drive an oscillation of the MEMS mirror 102 about the second scanning axis 112 at the second frequency.

The first MEMS driver 114 may be configured to sense a first rotational position of the MEMS mirror 102 about the first scanning axis 110 and provide first position information indicative of the first rotational position (e.g., tilt angle or degree of rotation about the first scanning axis 110) to the system controller 106. Similarly, the second MEMS driver 116 may be configured to sense a second rotational position of the MEMS mirror 102 about the second scanning axis 112 and provide second position information indicative of the second rotational position (e.g., tilt angle or degree of rotation about the second scanning axis 112) to the system controller 106.

The system controller 106 may use the first position information and the second position information to trigger light beams at the light transmitter 108. For example, the system controller 106 may use the first position information and the second position information to set a transmission time of light transmitter 108 in order to target a particular 2D coordinate of the 2D scanning pattern. Thus, a higher accuracy in position sensing of the MEMS mirror 102 by the first MEMS driver 114 and the second MEMS driver 116 may result in the system controller 106 providing more accurate and precise control of other components of the 2D scanning system 100A.

As noted above, the first MEMS driver 114 and the second MEMS driver 116 may apply a drive voltage to a corresponding actuator structure of the MEMS mirror 102 as the driving signal to drive a rotation (e.g., an oscillation) of the MEMS mirror 102 about a respective scanning axis (e.g., the first scanning axis 110 or the second scanning axis 112). The drive voltage can be switched or toggled between a high-voltage (HV) level and a low-voltage (LV) level resulting in an oscillating driving force. In some implementations, the LV level may be zero (e.g., the drive voltage is off), but is not limited thereto and could be a non-zero value. When the drive voltage is toggled between an HV level and an LV level and the LV level is set to zero, it can be said that the drive voltage is toggled on and off (HV on/off). The oscillating driving force causes the MEMS mirror 102 to oscillate back and forth on the first scanning axis 110 or the second scanning axis 112 between two extrema. The drive voltage may be a constant drive voltage, meaning that the drive voltage is the same voltage when actuated (e.g., toggled on) or one or both of the HV level or the LV level of the drive voltage may be adjustable. However, it will be understood that the drive voltage is being toggled between the HV level and the LV level in order to produce the mirror oscillation. Depending on a configuration, this actuation can be regulated or adjusted by the system controller 106 by adjusting the drive voltage off time, a voltage level of the drive voltage, or a duty cycle. As noted above, frequency and phase of the drive voltage can also be regulated and adjusted.

In some implementations, the system controller 106 is configured to set a driving frequency of the MEMS mirror 102 for each scanning axis and is capable of synchronizing the oscillations about the first scanning axis 110 and the second scanning axis 112. In particular, the system controller 106 may be configured to control an actuation of the MEMS mirror 102 about each scanning axis by controlling the driving signals. The system controller 106 may control the frequency, the phase, the duty cycle, the HV level, and/or the LV level of the driving signals to control the actuations about the first scanning axis 110 and the second scanning axis 112. The actuation of the MEMS mirror 102 about a particular scanning axis controls its range of motion and scanning rate about that particular scanning axis.

For example, to make a Lissajous scanning pattern reproduce itself periodically with a frame rate frequency, the first frequency at which the MEMS mirror 102 is driven about the first scanning axis 110 and the second frequency at which the MEMS mirror 102 is driven about the second scanning axis 112 are different. A difference between the first frequency and the second frequency is set by a fixed frequency ratio that is used by the 2D scanning system 100A to form a repeatable Lissajous pattern (frame) with a frame rate. A new frame begins each time the Lissajous scanning pattern restarts, which may occur when a phase difference between a mirror phase about the first scanning axis 110 and a mirror phase about the second scanning axis 112 is zero. The system controller 106 may set the fixed frequency ratio and synchronize the oscillations about the first scanning axis 110 and the second scanning axis 112 to ensure this fixed frequency ratio is maintained based on the first position information and the second position information received from the first MEMS driver 114 and the second MEMS driver 116, respectively.

The light transmitter 108 may be a red-green-blue (RGB) light transmitter having red (R), green (G), and blue (B) light sources configured to generate RGB light beams. For example, the light transmitter 108 may include a red laser diode or light emitting diode for generating a red light beam, a green laser diode or light emitting diode for generating a green light beam, a blue laser diode or light emitting diode for generating a blue light beam, and first optical elements that combine the three colored light beams into an RGB light beam for output from the light transmitter 108. Accordingly, the light transmitter 108 is configured to transmit each RGB light beam on a transmission path toward the MEMS mirror 102. Each RGB light beam may be generated as a light pulse, and the light transmitter 108 may sequentially transmit multiple RGB light beams as the MEMS mirror 102 changes its transmission direction in order to target different 2D coordinates. A transmission sequence of the multiple RGB light beams and a timing thereof may be implemented by the light transmitter 108 according to a trigger signal received from the system controller 106.

It is to be noted that a particular RGB light beam may be made of a single color of light, a combination of two colors of light, or a combination of all three colors or light. For example, the system controller 106 may control which R, G, B light sources of the light transmitter 108 is triggered for a light transmission, including some or all of the R, G, B light sources. While some of the R, G, B light sources may remain inactive during a light transmission, an output light beam may still be referred to as an RGB light beam (e.g., despite not including all three colors of light). Alternatively, an "RGB light beam" may be referred to as a "pixel light beam" that includes one or more colors of light depending on the desired pixel color to be projected into the field of view. For example, a particular RGB light beam may correspond to a pixel of an image projected into the field of view or an image projected onto a display and different RGB light beams may be transmitted for different pixels of the image or for different image frames. Thus, the terms "RGB light beam" and "pixel light beam" can be used interchangeably.

The system controller 106 is configured to control components of the 2D scanning system 100A. In certain applications, the system controller 106 may also be configured to receive programming information with respect to the 2D scanning pattern and control a timing of the plurality of light beams generated by the light transmitter 108 based on the programming information. Thus, the system controller 106 may include both processing and control circuity that is configured to generate control signals for controlling the light transmitter 108, the first MEMS driver 114, and the second MEMS driver 116.

The system controller 106 is configured to set the driving frequencies of the MEMS mirror 102 for the first scanning axis 110 and the second scanning axis 112 and is capable of synchronizing the oscillations about the first scanning axis 110 and the second scanning axis 112 to generate the 2D scanning pattern. In some implementations, in which the plurality of light beams is used, the system controller 106 may be configured to generate the trigger signal used for triggering the light transmitter 108 to generate the plurality of light beams. Using the trigger signal, the system controller 106 can control the transmission times of the plurality of light beams (e.g., RGB light beams or pixel light beams) of the light transmitter 108 to achieve a desired illumination pattern within the field of view. The desired illumination pattern is produced by a combination of the 2D scanning pattern produced by the MEMS mirror 102 and the transmission times triggered by the system controller 106. In some implementations in which the continuous light beam is used, the system controller 106 may be configured to control a frequency modulation of the continuous light beam via a control signal provided to the light transmitter 108.

As indicated above, FIG. 1A is provided merely as an example. Other examples may differ from what is described with regard to FIG. 1A. In practice, the 2D scanning system 100A may include additional components, fewer components, different components, or differently arranged components than those shown in FIG. 1A without deviating from the disclosure provided above. In addition, in some implementations, the 2D scanning system 100A may include one or more additional 2D MEMS mirrors or one or more additional light transmitters used to scan one or more additional field of views. Additionally, two or more components shown in FIG. 1A may be implemented within a single component, or a single component shown in FIG. 1A may be implemented as multiple, distributed components. Additionally, or alternatively, a set of components (e.g., one or more components) of the 2D scanning system 100A may perform one or more functions described as being performed by another set of components of the 2D scanning system 100A.

Figure 1B:
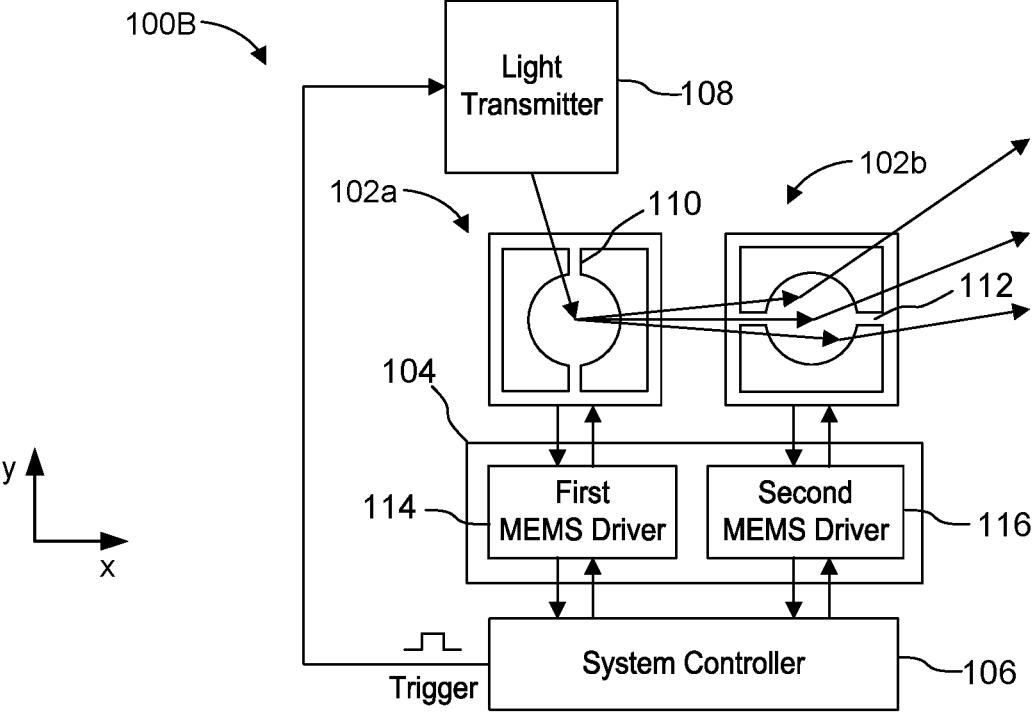
FIG. 1B is a schematic block diagram of a 2D scanning system according to one or more implementations.

FIG. 1B is a schematic block diagram of a 2D scanning system 100B according to one or more implementations. In particular, the 2D scanning system 100B includes two MEMS mirrors, a first MEMS mirror 102a and a second MEMS mirror 102b, that are optically coupled in series to steer or otherwise deflect light beams according to a 2D scanning pattern. The first MEMS mirror 102a and the second MEMS mirror 102b are similar to the MEMS mirror 102 described in FIG. 1A, with the exception that the first MEMS mirror 102a and the second MEMS mirror 102b are configured to rotate about a single scanning axis instead of two scanning axes. The first MEMS mirror 102a is configured to rotate about the first scanning axis 110 to steer light in the x-direction and the second MEMS mirror 102b is configured to rotate about the second scanning axis 112 to steer light in the y-direction. Similar to the MEMS mirror 102 described in FIG. 1A, the first MEMS mirror 102a and the second MEMS mirror 102b may be resonant MEMS mirrors configured to oscillate about the first scanning axis 110 and the second scanning axis 112, respectively.

Because each of the first MEMS mirror 102a and the second MEMS mirror 102b is configured to rotate about a single scanning axis, each of the first MEMS mirror 102a and the second MEMS mirror 102b is responsible for scanning light in one dimension. As a result, the first MEMS mirror 102a and the second MEMS mirror 102b may be referred to as one-dimensional (1D) MEMS mirrors. In the example shown in FIG. 1B, the first MEMS mirror 102a and the second MEMS mirror 102b are used together to steer light beams in two dimensions. The first MEMS mirror 102a and the second MEMS mirror 102b are arranged sequentially along a transmission path of the light beams such that one of the MEMS mirrors (e.g., the first MEMS mirror 102a) first receives a light beam and steers the light beam in a first dimension and the second one of the MEMS mirrors (e.g., the second MEMS mirror 102b) receives the light beam from the first MEMS mirror 102a and steers the light beam in a second dimension. As a result, the first MEMS mirror 102a and the second MEMS mirror 102b operate together to steer the light beam generated by the light transmitter 108 in two dimensions. In this way, the first MEMS mirror 102a and the second MEMS mirror 102b can direct the light beam at a desired 2D coordinate (e.g., an x-y coordinate) in the field of view. Multiple light beams can be steered by the first MEMS mirror 102a and the second MEMS mirror 102b at different 2D coordinates of a 2D scanning pattern.

The MEMS driver system 104, the system controller 106, and the light transmitter 108 are configured to operate as similarly described above in reference to FIG. 1A. The first MEMS driver 114 is electrically coupled to the first MEMS mirror 102a to drive the first MEMS mirror 102a about the first scanning axis 110 and to send a position of the first MEMS mirror 102a about the first scanning axis 110 to provide first position information to the system controller 106. Similarly, the second MEMS driver 116 is electrically coupled to the second MEMS mirror 102b to drive the second MEMS mirror 102b about the second scanning axis 112 and to send a position of the second MEMS mirror 102b about the second scanning axis 112 to provide second position information to the system controller 106.

As indicated above, FIG. 1B is provided merely as an example. Other examples may differ from what is described with regard to FIG. 1B. In practice, the 2D scanning system 100B may include additional components, fewer components, different components, or differently arranged components than those shown in FIG. 1B without deviating from the disclosure provided above. In addition, in some implementations, the 2D scanning system 100B may include one or more additional 1D MEMS mirrors or one or more additional light transmitters used to scan one or more additional field of views. Additionally, two or more components shown in FIG. 1B may be implemented within a single component, or a single component shown in FIG. 1B may be implemented as multiple, distributed components. Additionally, or alternatively, a set of components (e.g., one or more components) of the 2D scanning system 100B may perform one or more functions described as being performed by another set of components of the 2D scanning system 100B.

Figure 2:
FIG. 2 illustrates an example HUD system according to one or more implementations.
Figure 2:
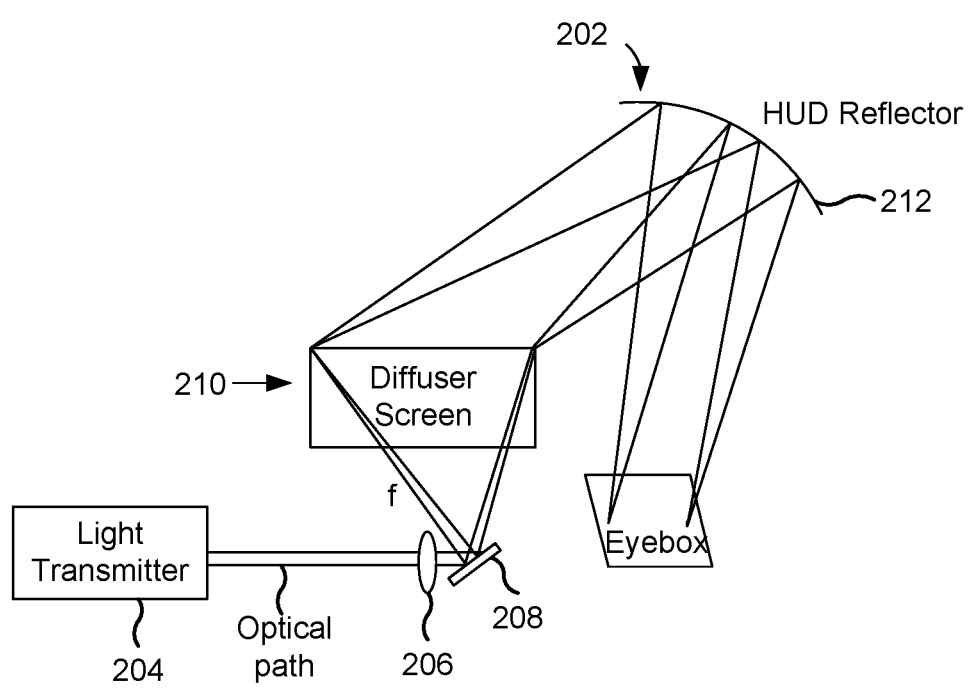

FIG. 2 illustrates an example HUD system 200 according to one or more implementations. The HUD system 200 may include a HUD reflector 202 (e.g., a HUD mirror) and a light transmitter 204 that may be configured to generate a plurality of pixel light beams corresponding to an image and transmit the plurality of pixel light beams on an optical path toward the HUD reflector. The HUD system 200 may further include a pre-scan lens 206 (e.g., a focusing lens), a 2D scanner 208, and a diffuser screen 210 that are arranged sequentially along the optical path between the light transmitter 204 and the HUD reflector 202.

The HUD system 200 may be configured to project the image into a region referred to as an "eyebox." The eyebox may be an area in which the image projected by the HUD system 200 can be perceived by a user. In other words, an eye-level of a user should be located within the eyebox to properly view the image. The eyebox should be able to accommodate users of different heights and different movements of the user, while enabling a user or different users to view the image. A smaller eyebox may be limiting in the sense that users of certain heights (e.g., users that are too short or too tall) may not reside, at eye-level, within the eyebox. In addition, a smaller eyebox may be limiting in the sense that a user's range of motion may be confined to smaller movements in order to maintain an ability to view the image. In contrast, a larger eyebox may accommodate a larger range of user heights and motions. Therefore, it may be beneficial to increase a size of the eyebox to enable the image to be viewed by differently-sized users and to enable a greater range of motion while using the HUD system 200.

The light transmitter 204 may be similar to the light transmitter 108 described in connection with FIGS. 1A and 1B. In some implementations, the light transmitter 204 may be part of an image generation unit that includes the 2D scanner 208. For example, the light transmitter 204 and the 2D scanner 208 may be used together to generate the image. The light transmitter 204 may be configured to sequentially generate a plurality of pixel light beams corresponding to an image and, thereby, sequentially transmit the plurality of pixel light beams on the optical path toward the 2D scanner 208.

The 2D scanner 208 may be a MEMS mirror that is included in a 2D scanning system similar to the 2D scanning system 100A described in connection with FIG. 1A or similar to the 2D scanning system 100B described in connection with FIG. 1B. Thus, the 2D scanner 208 may be configured to receive the plurality of pixel light beams from the light transmitter 204 and steer the plurality of pixel light beams along the optical path according to a 2D scanning pattern. For example, as the 2D scanner 208 changes its angle of deflection during a scanning operation, the 2D scanner 208 may scan the plurality of pixel light beams onto the diffuser screen 210 according to the 2D scanning pattern.

The pre-scan lens 206 may be used to focus the plurality of pixel light beams onto the diffuser screen 210 such that the image is projected in focus onto the diffuser screen 210. For example, the pre-scan lens 206 may be arranged on the optical path between the light transmitter 204 and the 2D scanner 208, and the pre-scan lens may be configured to receive the plurality of pixel light beams from the light transmitter 204 and focus the plurality of pixel light beams onto the diffuser screen 210. The pre-scan lens 206 may have a focal length f that is equal to a sum of a first distance between the pre-scan lens 206 and the 2D scanner 208, along the optical path, and a second distance between the 2D scanner 208 and the diffuser screen 210, along the optical path.

The diffuser screen 210 may be arranged on the optical path between the 2D scanner 208 and the HUD reflector 202. The diffuser screen 210 may be configured to receive the plurality of pixel light beams from the 2D scanner 208 and expand a beam width of each pixel light beam of the plurality of pixel light beams to generate a plurality of divergent pixel light beams. In other words, the diffuser screen 210 is a diffuser optical component that may be configured to produce divergent light beams to increase an optical spread of each of the plurality of pixel light beams. As a result, a beam width of the plurality of pixel light beams is increased by the diffuser screen 210 in order to increase a size of an eyebox (e.g., a size of an area at which the projected image can be perceived by the user). In some implementations, the diffuser screen 210 comprises a microlens array comprising a plurality of microlenses arranged in a 2D array. Each microlens of the microlens array may correspond to one pixel.

The HUD reflector 202 is configured to receive the plurality of divergent pixel light beams from the diffuser screen and reflect the plurality of divergent pixel light beams toward a field of view (e.g., toward the eyebox). The HUD reflector 202 has a curved body 212 used for projecting the image to a defined distance or to infinity.

As indicated above, FIG. 2 is provided merely as an example. Other examples may differ from what is described with regard to FIG. 2. The number and arrangement of components shown in FIG. 2 are provided as an example. In practice, the HUD system 200 may include additional components, fewer components, different components, or differently arranged components than those shown in FIG. 2. Two or more components shown in FIG. 2 may be implemented within a single component, or a single component shown in FIG. 2 may be implemented as multiple, distributed components. Additionally, or alternatively, a set of components (e.g., one or more components) of the HUD system 200 may perform one or more functions described as being performed by another set of components of the HUD system 200.

Figures 3A, 3B:
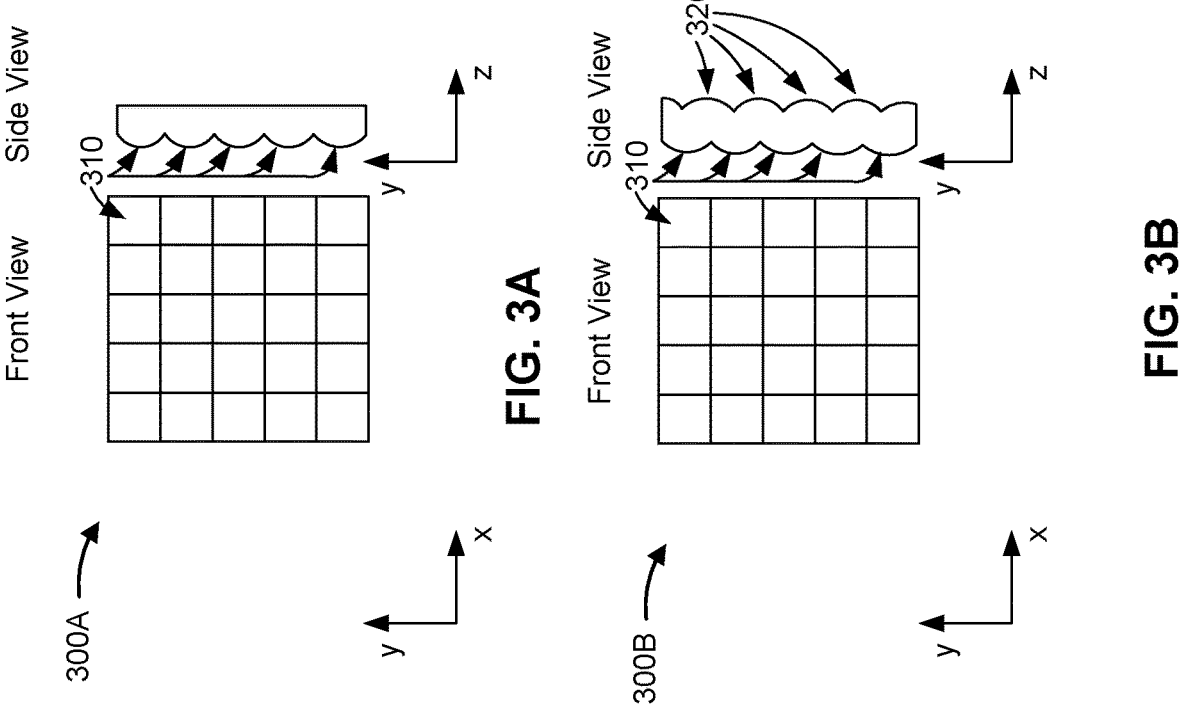
FIG. 3A illustrates a front view and a side view of a microlens array according to one or more implementations.
FIG. 3B illustrates a front view and a side view of a microlens array according to one or more implementations.

FIG. 3A illustrates a front view and a side view of a microlens array 300A according to one or more implementations. The microlens array 300A may be used as the diffuser screen 210 described in connection with FIG. 2. The microlens array 300A includes a plurality of microlenses 310 arranged in a 2D array. A microlens may also be referred to as a lenslet. Each microlens 310 has an area defined in an XY plane (e.g., a defined width and a defined height). In this example, the microlens array 300A is a single-sided microlens array such that each of the microlenses 310 is arranged on a same side of the microlens array 300A, whereas the opposite side of the microlens array 300A does not include any microlenses. In some implementations, the side that includes the microlenses may be a light receiving side of the microlens array 300A and the side that does not include any microlenses may be a light transmitting side of the microlens array 300A. If a light beam (e.g., a pixel light beam) is incident on two or more neighboring microlenses 310, the light components of the light beam that pass through the neighboring microlenses 310 may interfere and cause a brightness variation or another type of interference pattern when perceived by a user.

As indicated above, FIG. 3A is provided merely as an example. Other examples may differ from what is described with regard to FIG. 3A.

FIG. 3B illustrates a front view and a side view of a microlens array 300B according to one or more implementations. The microlens array 300B may be used as the diffuser screen 210 described in connection with FIG. 2. The microlens array 300B includes a plurality of microlenses 310 and a plurality of microlenses 320 arranged in a 2D array. Each microlens 310 and 320 has an area defined in an XY plane (e.g., a defined width and a defined height). In this example, the microlens array 300A is a dual-sided microlens array such that the microlenses 310 are arranged on one side of the microlens array 300B and the microlenses 320 are arranged on an opposite side of the microlens array 300B. If a light beam (e.g., a pixel light beam) is incident on two or more neighboring microlenses 310, 320, the light components of the light beam that pass through the neighboring microlenses 310, 320 may interfere and cause a brightness variation or another type of interference pattern when perceived by a user.

As indicated above, FIG. 3B is provided merely as an example. Other examples may differ from what is described with regard to FIG. 3B.

Figure 4A:
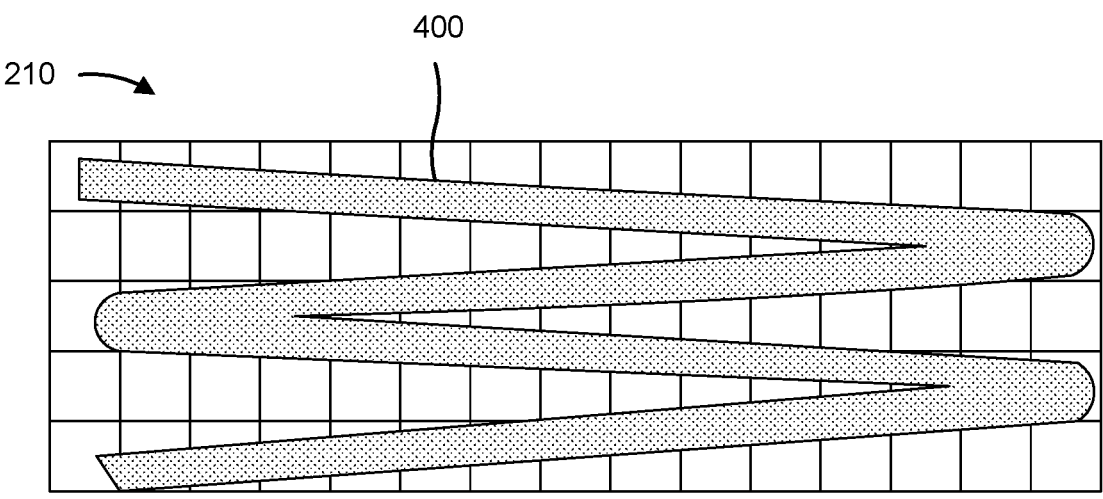
FIG. 4A illustrates an example 2D scanning pattern superimposed onto a diffuser screen according to one or more implementations.

FIG. 4A illustrates an example 2D scanning pattern 400 superimposed on the diffuser screen 210. For example, the 2D scanning pattern 400 may be a Lissajous scanning pattern. There are instances where the 2D scanning pattern 400 overlaps with two or more microlenses (e.g., microlenses 310 and/or 320) of the diffuser screen 210 that may cause light interference and brightness variations.

As indicated above, FIG. 4A is provided merely as an example. Other examples may differ from what is described with regard to FIG. 4A.

Figure 4B:
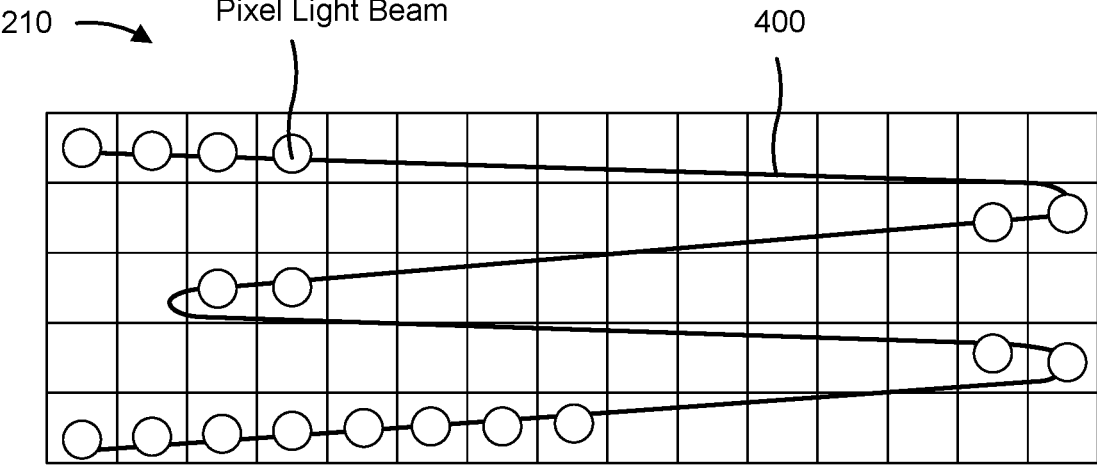
FIG. 4B illustrates an example of light beam transmissions superimposed onto a diffuser screen according to one or more implementations.

FIG. 4B illustrates an example of light beam transmissions superimposed onto the diffuser screen 210. A 2D scanner (e.g., the 2D scanner 208) may be configured to scan a plurality of pixel light beams transmitted by a light transmitter (e.g., the light transmitter 204) according to the 2D scanning pattern illustrated in FIG. 4A. A controller (e.g., the system controller 106) may be configured to synchronize transmission times of the plurality of pixel light beams with a movement of the 2D scanner 208 such that trajectories of the plurality of pixel light beams are matched with a geometry of the microlens array of the diffuser screen 210. The trajectories of the plurality of pixel light beams may be matched with the geometry of the microlens array such that each pixel light beam is incident on only a single microlens of the plurality of microlenses of the microlens array.

Because the 2D scanner 208 is constantly in motion, each consecutive pixel light beam that is transmitted is incident on a different microlens within a scanning period. For example, the 2D scanner 208 may include a first scanning axis on which the 2D scanner 208 oscillates at a first oscillation frequency and a second scanning axis on which the 2D scanner 208 oscillates at a second oscillation frequency. A Lissajous scanning pattern may be generated by setting the first oscillation frequency to be different from the second oscillation frequency by a predetermined ratio. The scanning period may be defined as an interval that passes until the 2D scanning pattern repeats.

In addition, a beam width of each pixel light beam incident on the diffuser screen 210 is smaller than a width of a microlens, such that each pixel light beam may be incident on only one microlens at a time. In other words, a cross-section of each pixel light beam is smaller than an area of a microlens.

The system controller 106 may be configured to trigger the plurality of pixel light beams according to a transmission sequence. Transmission times may occur at regular intervals for the transmission sequence. Furthermore, the system controller 106 may be configured to skip a transmission of a pixel light beam in the transmission sequence based on an estimated trajectory of the pixel light beam being incident on two or more microlenses of the plurality of microlenses of the diffuser screen 210. Thus, the system controller 106 may trigger a pixel light beam only when the estimated trajectory of the pixel light beam is projected onto a single microlens, otherwise the pixel light beam is skipped (e.g., not transmitted). The system controller 106 may be configured to estimate a trajectory of each pixel light beam of the plurality of pixel light beams (e.g., based on a transmission time and a scanning pattern and/or scanning position of the 2D scanner 208), and skip a transmission of a pixel light beam based on the estimated trajectory being incident on two or more microlenses of the plurality of microlenses of the diffuser screen 210. As a result, interference that may occur when a pixel light beam is incident on two or more neighboring microlenses may be prevented.

As indicated above, FIG. 4B is provided merely as an example. Other examples may differ from what is described with regard to FIG. 4B.

Figure 4C:
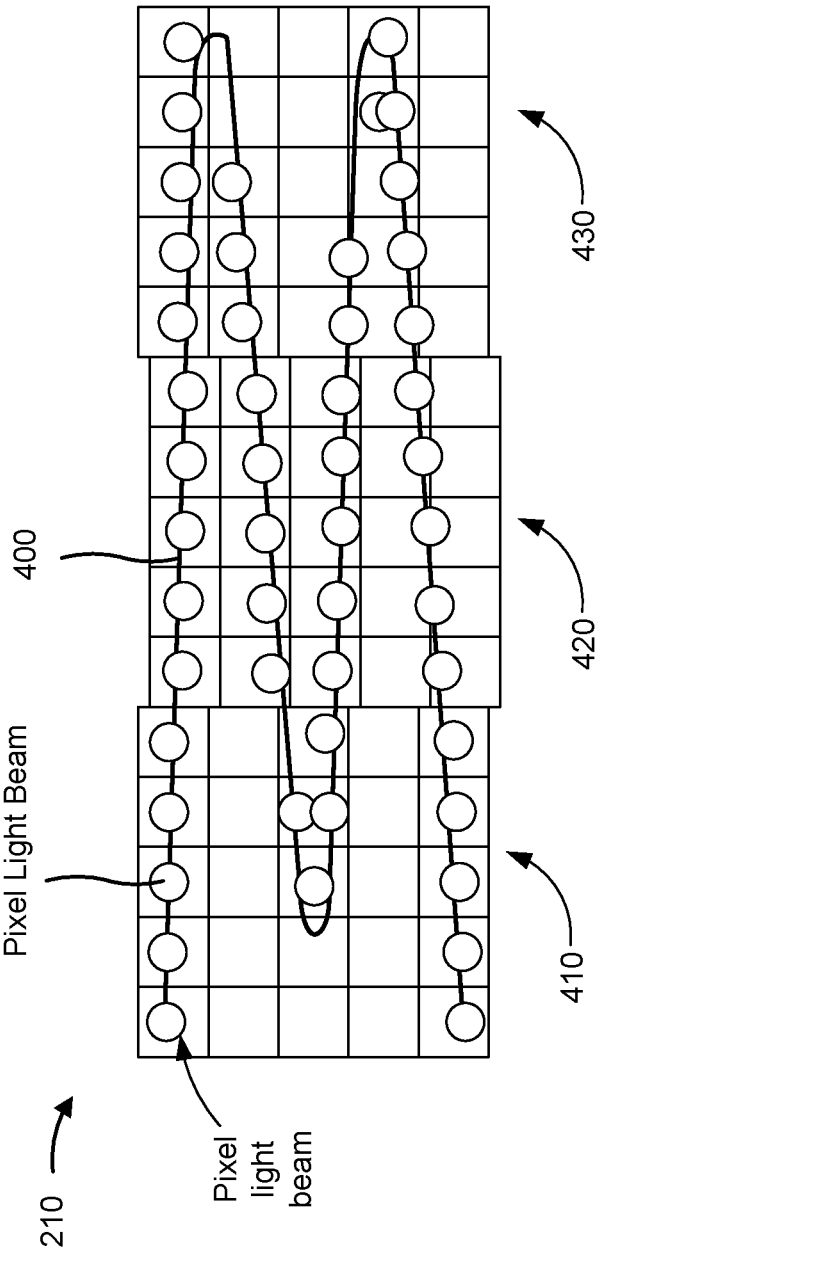
FIG. 4C illustrates an example of light beam transmissions superimposed onto a diffuser screen according to one or more implementations.

FIG. 4C illustrates an example of light beam transmissions superimposed onto the diffuser screen 210. A 2D scanner (e.g., the 2D scanner 208) may be configured to scan a plurality of pixel light beams transmitted by a light transmitter (e.g., the light transmitter 204) according to the 2D scanning pattern illustrated in FIG. 4A. A controller (e.g., the system controller 106) may be configured to synchronize transmission times of the plurality of pixel light beams with a movement of the 2D scanner 208 such that trajectories of the plurality of pixel light beams are matched with a geometry of the microlens array of the diffuser screen 210. The trajectories of the plurality of pixel light beams may be matched with the geometry of the microlens array such that each pixel light beam is incident on only a single microlens of the microlens array.

The geometry of the microlens array may match the 2D scanning pattern of the 2D scanner 208. For example, the diffuser screen 210 may include a plurality of sections (e.g., a first section 410, a second section 420, and a third section 430) that each include a different group of microlenses. Thus, the first section 410 may include a first group of microlenses of the microlens array, the second section 420 may include a second group of microlenses of the microlens array, and the third section 430 may include a third group of microlenses of the microlens array. In addition, the first section 410 may be shifted relative to the second section 420 and the third section 430, and the second section 420 may be shifted relative to the first section 410 and the third section 430 such that the geometry of the microlens array matches the 2D scanning pattern. As a result, each transmission of a pixel light beam may be aligned with a single microlens of the microlens array and interference that may occur when a pixel light beam is incident on two or more neighboring microlenses may be prevented.

Additionally, the system controller 106 may be configured to skip a transmission of a pixel light beam in the transmission sequence based on an estimated trajectory of the pixel light beam being incident on two or more microlenses of the plurality of microlenses of the diffuser screen 210. Thus, the system controller 106 may trigger a pixel light beam only when the estimated trajectory of the pixel light beam is projected onto a single microlens, otherwise the pixel light beam is skipped (e.g., not transmitted). However, because the geometry of the microlens array matches the 2D scanning pattern, fewer transmissions may be skipped when compared with FIG. 4B.

As indicated above, FIG. 4C is provided merely as an example. Other examples may differ from what is described with regard to FIG. 4C.

Figure 5A:
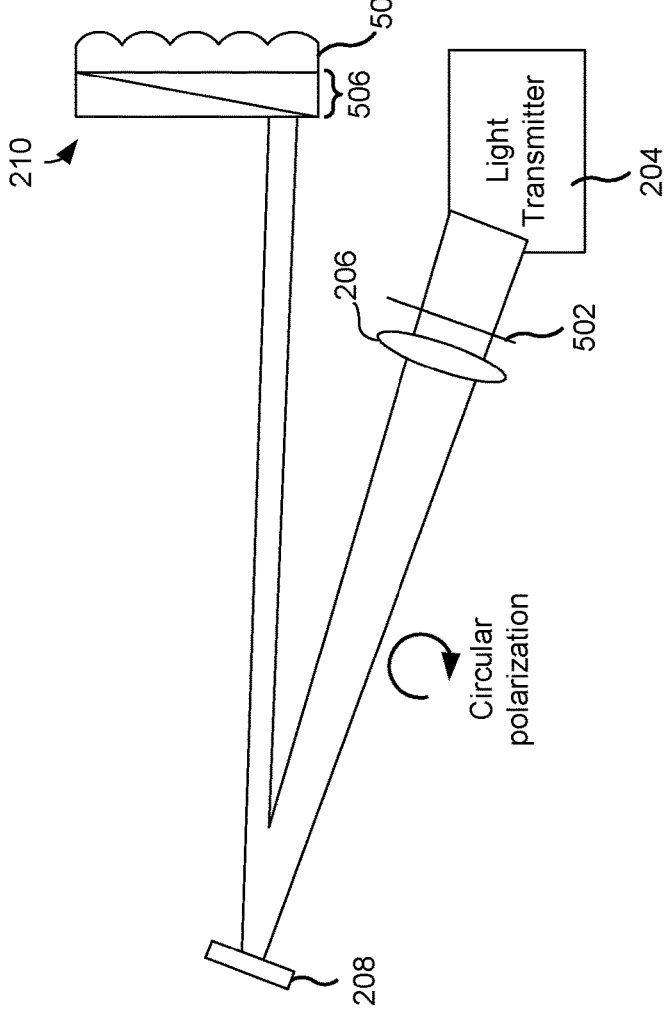
FIG. 5A illustrates a light beam scanning system according to one or more implementations.
Figure 5B:
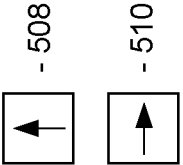
FIG. 5B illustrates a front view of a diffuser screen, including a polarization mask, according to one or more implementations.
Figure 5B:
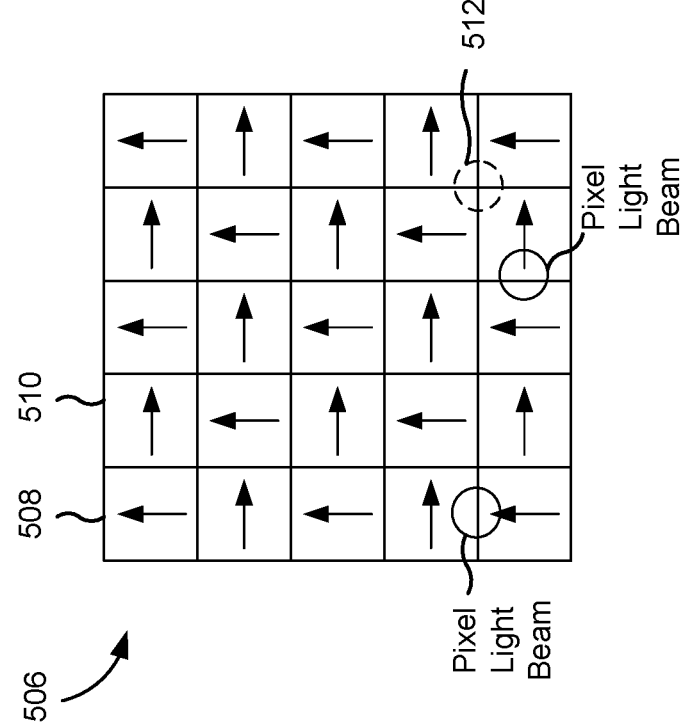

FIG. 5A illustrates a light beam scanning system 500 according to one or more implementations. FIG. 5B illustrates a diffuser screen of the light beam scanning system 500. The light beam scanning system 500 may be used in the HUD system 200 described in connection with FIG. 2. The light beam scanning system 500 includes the light transmitter 204, the pre-scan lens 206 (e.g., a focusing lens), the 2D scanner 208, and the diffuser screen 210. In addition, the light beam scanning system 500 includes a waveplate 502 arranged on the optical path between the light transmitter 204 and the diffuser screen 210. In some implementations, the waveplate 502 may be arranged between the light transmitter 204 and the pre-scan lens 206. In some implementations, the waveplate 502 may be arranged between the pre-scan lens 206 and the 2D scanner 208. In some implementations, the waveplate 502 may be arranged between the 2D scanner 208 and the diffuser screen 210. The waveplate 502 is configured to convert a polarization of the plurality of pixel light beams transmitted by the light transmitter 204 into a circular polarization. In other words, the light transmitter 204 may transmit linearly polarized light that is converted by the waveplate 502 into circularly polarized light. In some implementations, the waveplate 502 may be a quarter-wave plate. In some implementations, two or more waveplates may be used to convert the linearly polarized light into circularly polarized light.

The diffuser screen 210 includes a microlens array 504 that includes a plurality of microlenses arranged in a first 2D array. For example, the microlens array 504 may be similar to microlens array 300A or 300B. In addition, the diffuser screen 210 includes a polarization mask 506 coupled to the microlens array 504. For example, the polarization mask 506 may be superimposed on the microlens array 504.

FIG. 5B illustrates a front view of the diffuser screen 210, including the polarization mask 506. The polarization mask 506 may include a polarization array that comprises a plurality of polarization components arranged in a second 2D array that is matched with the first 2D array. For example, each polarization component may be matched with a respective microlens of the microlens array 504. Thus, a pattern or a geometry of the first 2D array may be matched with a pattern or a geometry of the second 2D array. The plurality of polarization components may be, for example, a plurality of polarization filters or a plurality of waveplates.

In addition, the plurality of polarization components may include a first subset of polarization components 508, each having a first polarization (e.g., a first linear polarization) and a second subset of polarization components 510, each having a second polarization (e.g., a second linear polarization) that is perpendicular to the first polarization. Moreover, the first subset of polarization components 508 and the second subset of polarization components 510 may be intermixed in a checkered pattern. As a result, laterally adjacent or laterally neighboring polarization components may have different polarizations. For example, no two polarization components of the first subset of polarization components 508 are arranged laterally adjacent to each other. Also, no two polarization components of the second subset of polarization components 510 are arranged laterally adjacent to each other. Polarization components 508 or 510 arranged diagonally with respect to each other may have a same polarization.

The first subset of polarization components 508 are each configured to convert the circular polarization into a first linear polarization such that pixel light beams with the first linear polarization are produced by the first subset of polarization components 508. Additionally, the second subset of polarization components 510 are each configured to convert the circular polarization into a second linear polarization that is perpendicular to the first linear polarization such that pixel light beams with the second linear polarization are produced by the second subset of polarization components 510. Light beams that have perpendicular polarizations do not interfere with each other. As a result, if a pixel light beam is incident on two laterally adjacent polarization components (e.g., one polarization component 508 and one polarization component 510), the light passed through the two laterally adjacent polarization components would have perpendicular polarizations with respect to each other and would not interfere.

In some implementations, a controller (e.g., system controller 106) may be configured to synchronize transmission times of the plurality of pixel light beams with a movement of the 2D scanner 208 such that trajectories of the plurality of pixel light beams are matched with a geometry of the polarization array of the polarization mask 506. For example, the system controller 106 may match the trajectories of the plurality of pixel light beams with the geometry of the polarization array such that each pixel light beam is incident on no more than two polarization components of the plurality of polarization components. This means that each pixel light beam may be incident on at most one polarization component 508 and one polarization component 510. As a result of the trajectory control performed by the system controller 106 in combination with the polarization mask 506, the light beam scanning system 500 may prevent interfering light components from being produced by the diffuser screen 210 and may prevent brightness variations from occurring in the projected image.

In addition, a beam width of each pixel light beam incident on the diffuser screen 210 may be smaller than a width of a microlens. In other words, a cross-section of each pixel light beam is smaller than an area of a microlens. Thus, each pixel light beam may be incident on either a single polarization component of the first subset of polarization components 508, a single polarization component of the second subset of polarization components 510, or one polarization component of the first subset of polarization components 508 and one polarization component of the second subset of polarization components 510. As a result of the trajectory control performed by the system controller 106 in combination with the beam width of the pixel light beams and the polarization mask 506, the light beam scanning system 500 may prevent interfering light components from being produced by the diffuser screen 210 and may prevent brightness variations from occurring in the projected image.

In some implementations, the system controller 106 may be configured to trigger the plurality of pixel light beams according to a transmission sequence and skip a transmission of a pixel light beam in the transmission sequence based on an estimated trajectory of the pixel light beam being incident on two polarization components of the first subset of polarization components 508 or two polarization components of the second subset of polarization components 510. In other words, the system controller 106 may be configured to estimate a trajectory of each pixel light beam of the plurality of pixel light beams (e.g., based on a transmission time and a scanning pattern and/or scanning position of the 2D scanner 208), and skip a transmission of a pixel light beam based on the estimated trajectory being incident on two polarization components of a same type. For example, a transmission in the transmission sequence may be skipped if the estimated trajectory is incident on diagonally adjacent polarization components, such as the case in area 512. As a result, interference that can occur when a pixel light beam is incident on two polarization components of the same type may be prevented.

The number and arrangement of components shown in FIGS. 5A and 5B are provided as examples. In practice, the light beam scanning system 500 may include additional components, fewer components, different components, or differently arranged components than those shown in FIGS. 5A and 5B.

Figures 6A, 6B:
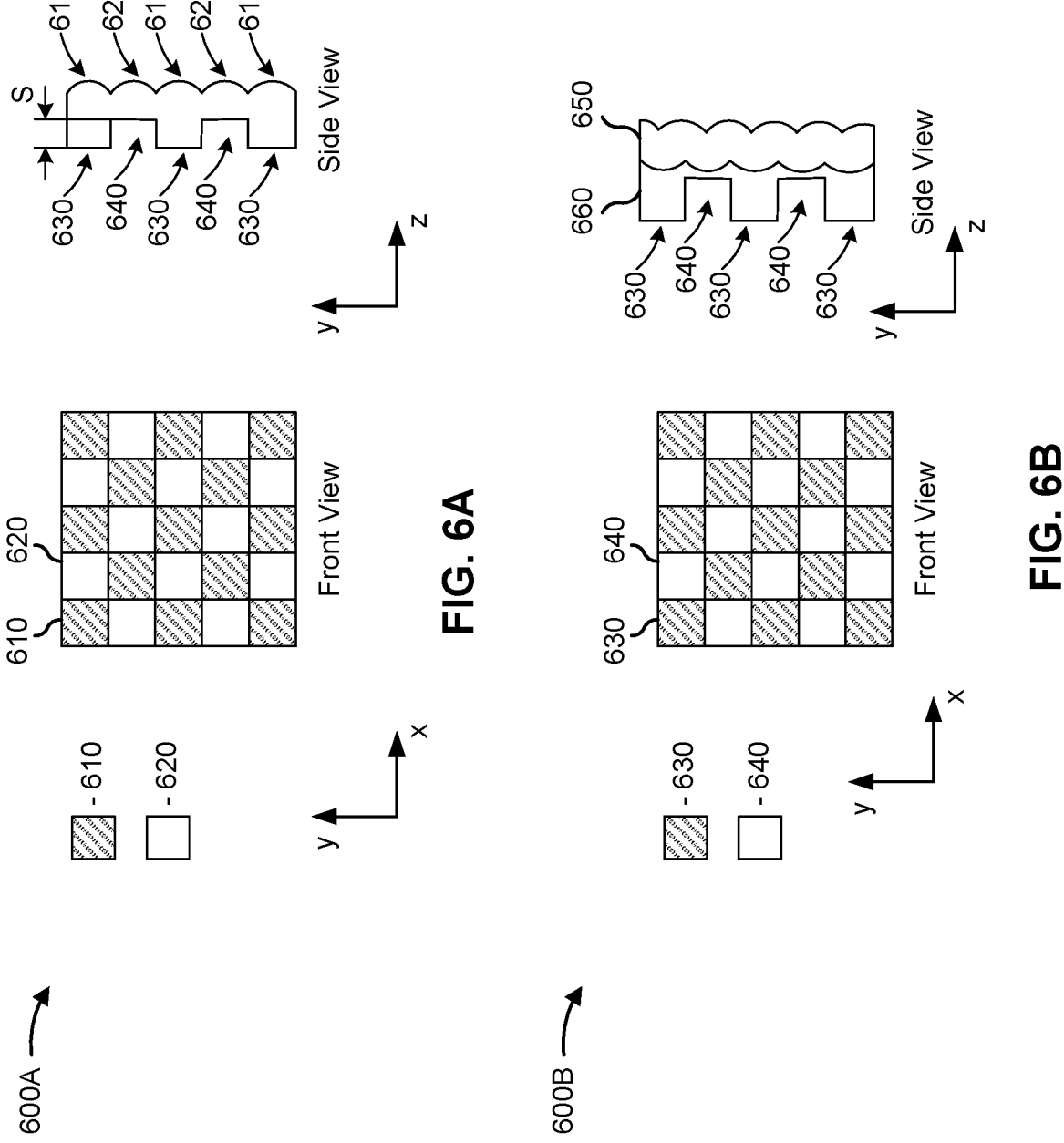
FIG. 6A illustrates a front view and a side view of a diffuser screen according to one or more implementations.
FIG. 6B illustrates a front view and a side view of a diffuser screen according to one or more implementations.

FIG. 6A illustrates a front view and a side view of a diffuser screen 600A according to one or more implementations. The diffuser screen 600A may be used as the diffuser screen 210 described in connection with FIG. 2. The diffuser screen 600A may be composed of a material (e.g., a substrate) having a first refractive index n1. The diffuser screen 600A comprises a microlens array comprising a plurality of microlenses arranged in a 2D array. The plurality of microlenses comprises a first subset of microlenses 610, each associated with a first optical path length, and a second subset of microlenses 620, each associated with a second optical path length that is different from the first optical path length. In some implementations, the first subset of microlenses 610 and the second subset of microlenses 620 may be intermixed in a checkered pattern.

The diffuser screen 600A may include a plurality of protrusion portions 630 and a plurality of recess portions 640 that alternate with the plurality of protrusion portions 630 in a first dimension (e.g., an x-dimension) and in a second dimension (e.g., a y-dimension) of the microlens array to form a 2D array structure that is matched with a pattern of the 2D array of the microlens array. Thus, the plurality of protrusion portions 630 provide a first optical path length, and a plurality of recess portions 640 provide a second optical path length that is different from the first optical path length. For example, the second optical path length may be longer than the first optical path length. Each of the first subset of microlenses 610 may aligned with a respective protrusion portion 630 and may be associated with the first optical path length. Each of the second subset of microlenses 620 may aligned with a respective recess portion 640 and may be associated with the second optical path length.

An optical path difference s, which may further depend on the refractive index of the diffuser screen, between the first optical path length and the second optical path length of two neighboring microlenses may be sufficiently large (e.g., greater than a coherence length) to eliminate interference between light that is projected from the two neighboring microlenses. In order to use the optical path difference s to eliminate interference between light that is projected from the two neighboring microlenses, the light transmitter 204 may include a signal modulator that is configured to modulate the plurality of pixel light beams to remove a temporal coherence of the plurality of pixel light beams. Thus, the microlens array of the diffuser screen 600A may be configured to output at least two beam components for each pair of neighboring pixel light beams, and the optical path difference of two neighboring microlenses is greater than a coherence length of the at least two beam components such that the at least two beam components do not interfere with each other.

As indicated above, FIG. 6A is provided merely as an example. Other examples may differ from what is described with regard to FIG. 6A.

FIG. 6B illustrates a front view and a side view of a diffuser screen 600B according to one or more implementations. The diffuser screen 600B may be used as the diffuser screen 210 described in connection with FIG. 2. The diffuser screen 600B may include a first substrate 650 having the first refractive index n1 and a second substrate 660 having a second refractive index n2 that is different from the first refractive index n1 so that the second substrate 660 has no refractive power. The microlens array of the diffuser screen 600B may be formed from the first substrate 650. Additionally, the second substrate 660 comprises the plurality of protrusion portions 630 and the plurality of recess portions 640 that alternate with the plurality of protrusion portions 630 in the first dimension (e.g., an x-dimension) and in the second dimension (e.g., a y-dimension) of the microlens array to form the 2D array structure that is matched with the pattern of the 2D array of the microlens array.

An optical path difference s (e.g., produced by s×n1) between the first optical path length and the second optical path length of two neighboring microlenses may be sufficiently large (e.g., greater than a coherence length) to eliminate interference between light that is projected from the two neighboring microlenses. In order to use the optical path difference s to eliminate interference between light that is projected from the two neighboring microlenses, the light transmitter 204 may include a signal modulator that is configured to modulate the plurality of pixel light beams to remove a temporal coherence of the plurality of pixel light beams. Thus, the microlens array of the diffuser screen 600B may be configured to output at least two beam components for each pair of neighboring pixel light beams, and the optical path difference of two neighboring microlenses is greater than a coherence length of the at least two beam components such that the at least two beam components do not interfere with each other.

As indicated above, FIG. 6B is provided merely as an example. Other examples may differ from what is described with regard to FIG. 6B.

Figure 7A:
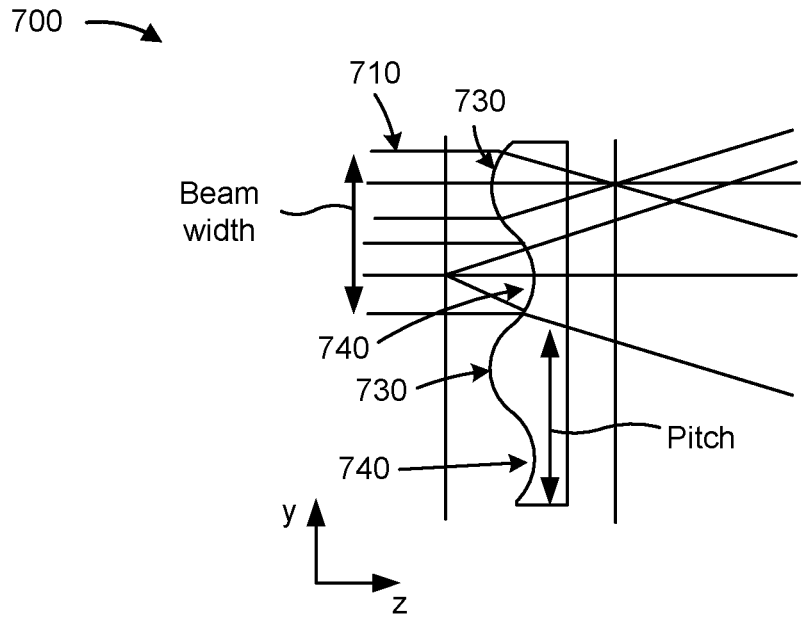
FIGS. 7A and 7B illustrate a side view of a diffuser screen according to one or more implementations.
Figure 7B:
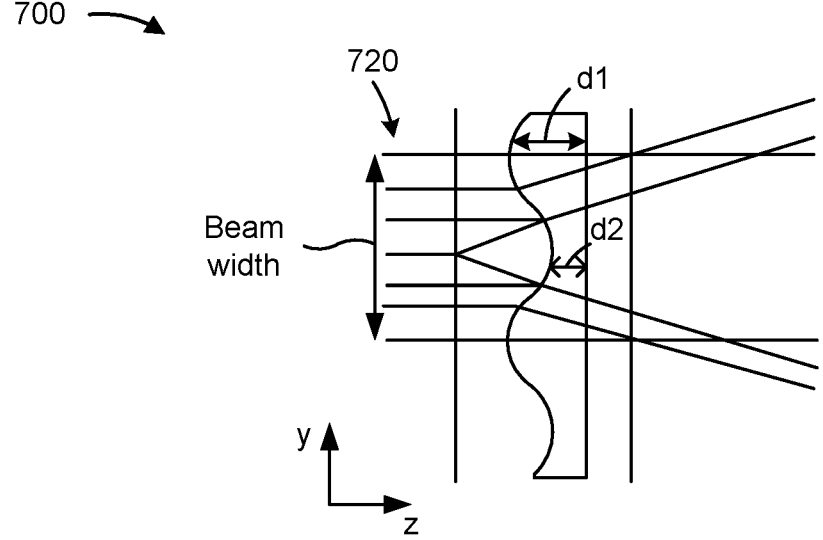

FIGS. 7A and 7B illustrate a side view of a diffuser screen 700 according to one or more implementations. FIG. 7A shows a first beam alignment of a first pixel light beam 710 with the diffuser screen 700, and FIG. 7B shows a second beam alignment of a second pixel light beam 720 with the diffuser screen 700. For example, the second beam alignment may be shifted from the first beam alignment. The diffuser screen 700 comprises a microlens array comprising a plurality of microlenses arranged in a 2D array. The plurality of microlenses comprises a first subset of microlenses 730 (e.g., a plurality of positive lens components), each associated with a first optical path length, and a second subset of microlenses 740 (e.g., a plurality of negative lens components), each associated with a second optical path length that is different from the first optical path length. The first subset of microlenses 730 may alternate with the second subset of microlenses 740 in a first dimension (e.g., an x-direction) and in a second dimension (e.g., y-direction) of the microlens array. For example, the first subset of microlenses 730 and the second subset of microlenses 740 may be intermixed in a checkered pattern.

The first subset of microlenses 730 may be positive lens components, such as convex microlenses, or protrusion portions. The second subset of microlenses 740 may be negative lens components, such as concave microlenses, or recess portions. As a result, the microlens array of the diffuser screen 700 may have a first periodic contour (e.g., sinusoidal contour) that extends in the first dimension and a second periodic contour (e.g., sinusoidal contour) that extends in the second dimension. A positive lens component and a neighboring negative lens component may define a pitch (e.g., one period) of the microlens array. For example, each negative lens component may have a first width dimension and each positive lens may have a second width dimension, where a sum of the first width dimension and the second width dimension defines the pitch of the microlens array.

Each negative lens component of the plurality of negative lens components and each positive lens component plurality of positive lens components may produce a same light divergence so that beam components of a pixel light beam are transmitted in a same divergence angle. In addition, the beam width of each pixel light beam incident on the diffuser screen 700 may be equal to or approximately equal to the pitch of the microlens array such that interfering light components are not produced by the diffuser screen 700. As a result, the first subset of microlenses 730 provide the first optical path length d1 and the second subset of microlenses 740 provide the second optical path length d2 with the same light divergence.

The first optical path length and the second optical path length define an optical path difference of two neighboring microlenses that may be sufficiently large (e.g., greater than a coherence length) to eliminate interference between light that is projected from the two neighboring microlenses. In order to use the optical path difference s to eliminate interference between light that is projected from the two neighboring microlenses, the light transmitter 204 may include a signal modulator that is configured to modulate the plurality of pixel light beams to remove a temporal coherence of the plurality of pixel light beams. Thus, the diffuser screen 700 may be configured to output at least two beam components for each pair of neighboring pixel light beams, and the optical path difference of two neighboring microlenses is greater than a coherence length of the at least two beam components such that the at least two beam components do not interfere with each other.

As indicated above, FIGS. 7A and 7B are provided merely as examples. Other examples are possible and may differ from what is described with regard to FIGS. 7A and 7B.

The following provides an overview of some Aspects of the present disclosure:

Aspect 1: A light beam scanning system, comprising: a light transmitter configured to generate a plurality of pixel light beams corresponding to an image and transmit the plurality of pixel light beams on an optical path; a two-dimensional (2D) scanner arranged on the optical path, wherein the 2D scanner is configured to receive the plurality of pixel light beams from the light transmitter and steer the plurality of pixel light beams along the optical path according to a 2D scanning pattern; a diffuser screen arranged on the optical path downstream from the 2D scanner, wherein the diffuser screen is configured to receive the plurality of pixel light beams from the 2D scanner and expand a beam width of each pixel light beam of the plurality of pixel light beams to generate a plurality of divergent pixel light beams, wherein the 2D scanner is configured to scan the plurality of pixel light beams onto the diffuser screen according to the 2D scanning pattern, and wherein the diffuser screen comprises a microlens array comprising a plurality of microlenses arranged in a 2D array; and a controller configured to synchronize transmission times of the plurality of pixel light beams with a movement of the 2D scanner such that trajectories of the plurality of pixel light beams are matched with a geometry of the microlens array, wherein the trajectories of the plurality of pixel light beams are matched with the geometry of the microlens array such that each pixel light beam is incident on only a single microlens of the plurality of microlenses.

Aspect 2: The light beam scanning system of Aspect 1, wherein each consecutive pixel light beam of the plurality of pixel light beams is incident on a different microlens of the plurality of microlenses.

Aspect 3: The light beam scanning system of any of Aspects 1-2, wherein the beam width of each pixel light beam incident on the diffuser screen is smaller than a width of a microlens.

Aspect 4: The light beam scanning system of any of Aspects 1-3, wherein the 2D scanner comprises a first scanning axis on which the 2D scanner oscillates at a first oscillation frequency and a second scanning axis on which the 2D scanner oscillates at a second oscillation frequency.

Aspect 5: The light beam scanning system of any of Aspects 1-4, wherein the controller is configured to trigger the plurality of pixel light beams according to a transmission sequence, and wherein the controller is configured to skip a transmission of a pixel light beam in the transmission sequence based on an estimated trajectory of the pixel light beam being incident on two or more microlenses of the plurality of microlenses.

Aspect 6: The light beam scanning system of Aspect 5, wherein the transmission times occur at regular intervals for the transmission sequence.

Aspect 7: The light beam scanning system of any of Aspects 1-6, wherein the controller is configured to estimate a trajectory of each pixel light beam of the plurality of pixel light beams, and to skip a transmission of a pixel light beam based on the estimated trajectory being incident on two or more microlenses of the plurality of microlenses.

Aspect 8: The light beam scanning system of any of Aspects 1-7, wherein the geometry of the microlens array matches the 2D scanning pattern.

Aspect 9: The light beam scanning system of any of Aspects 1-8, wherein the diffuser screen comprises a first section comprising a first group of microlenses of the microlens array and a second section comprising a second group of microlenses of the microlens array, and wherein the first section is shifted relative to the second section such that the geometry of the microlens array matches the 2D scanning pattern.

Aspect 10: The light beam scanning system of any of Aspects 1-9, wherein the diffuser screen is configured to produce only a single divergent pixel beam for each pixel light beam of the plurality of pixel light beams.

Aspect 11: The light beam scanning system of any of Aspects 1-10, further comprising: a focusing lens arranged on the optical path between the light transmitter and the diffuser screen, wherein the focusing lens is configured to receive the plurality of pixel light beams from the light transmitter and focus the plurality of pixel light beams onto the diffuser screen.

Aspect 12: The light beam scanning system of any of Aspects 1-11, further comprising: a head-up display (HUD) reflector configured to receive the plurality of divergent pixel light beams from the diffuser screen and reflect the plurality of divergent pixel light beams toward a field of view.

Aspect 13: The light beam scanning system of any of Aspects 1-12, wherein the 2D scanning pattern is a Lissajous scanning pattern.

Aspect 14: A light beam scanning system, comprising: a light transmitter configured to generate a plurality of pixel light beams corresponding to an image and transmit the plurality of pixel light beams on an optical path; a two-dimensional (2D) scanner arranged on the optical path, wherein the 2D scanner is configured to receive the plurality of pixel light beams from the light transmitter and steer the plurality of pixel light beams along the optical path according to a 2D scanning pattern; and a diffuser screen arranged on the optical path downstream from the 2D scanner, wherein the diffuser screen is configured to receive the plurality of pixel light beams from the 2D scanner and expand a beam width of each pixel light beam of the plurality of pixel light beams to generate a plurality of divergent pixel light beams, wherein the 2D scanner is configured to scan the plurality of pixel light beams onto the diffuser screen according to the 2D scanning pattern, wherein the diffuser screen comprises a microlens array comprising a plurality of microlenses arranged in a first 2D array, wherein the diffuser screen comprises a polarization mask comprising a polarization array, wherein the polarization array comprises a plurality of polarization components arranged in a second 2D array that is matched with the first 2D array, wherein the plurality of polarization components comprises a first subset of polarization components each having a first polarization and a second subset of polarization components each having a second polarization that is perpendicular to the first polarization, and wherein the first subset of polarization components and the second subset of polarization components are intermixed in a checkered pattern.

Aspect 15: The light beam scanning system of Aspect 14, wherein the plurality of polarization components is a plurality of polarization filters or a plurality of waveplates.

Aspect 16: The light beam scanning system of any of Aspects 14-15, further comprising: at least one waveplate arranged on the optical path between the light transmitter and the diffuser screen, wherein the at least one waveplate is configured to convert a polarization of the plurality of pixel light beams into a circular polarization.

Aspect 17: The light beam scanning system of Aspect 16, wherein the first subset of polarization components are each configured to convert the circular polarization into a first linear polarization, and wherein the second subset of polarization components are each configured to convert the circular polarization into a second linear polarization that is perpendicular to the first linear polarization.

Aspect 18: The light beam scanning system of any of Aspects 14-17, wherein no two polarization components of the first subset of polarization components are laterally adjacent to each other, and wherein no two polarization components of the second subset of polarization components are laterally adjacent to each other.

Aspect 19: The light beam scanning system of any of Aspects 14-18, wherein the beam width of each pixel light beam incident on the diffuser screen is smaller than a width of a microlens.

Aspect 20: The light beam scanning system of any of Aspects 14-19, further comprising: a controller configured to synchronize transmission times of the plurality of pixel light beams with a movement of the 2D scanner such that trajectories of the plurality of pixel light beams are matched with a geometry of the polarization array.

Aspect 21: The light beam scanning system of Aspect 20, wherein the trajectories of the plurality of pixel light beams are matched with the geometry of the polarization array such that each pixel light beam is incident on no more than two polarization components of the plurality of polarization components.

Aspect 22: The light beam scanning system of Aspect 21, wherein each pixel light beam is incident on either a single polarization component of the first subset of polarization components, a single polarization component of the second subset of polarization components, or one polarization component of the first subset of polarization components and one polarization component of the second subset of polarization components.

Aspect 23: The light beam scanning system of Aspect 20, wherein the controller is configured to trigger the plurality of pixel light beams according to a transmission sequence, and wherein the controller is configured to skip a transmission of a pixel light beam in the transmission sequence based on an estimated trajectory of the pixel light beam being incident on two polarization components of the first subset of polarization components or two polarization components of the second subset of polarization components.

Aspect 24: A light beam scanning system, comprising: a light transmitter configured to generate a plurality of pixel light beams corresponding to an image and transmit the plurality of pixel light beams on an optical path; a two-dimensional (2D) scanner arranged on the optical path, wherein the 2D scanner is configured to receive the plurality of pixel light beams from the light transmitter and steer the plurality of pixel light beams along the optical path according to a 2D scanning pattern; and a diffuser screen arranged on the optical path downstream from the 2D scanner, wherein the diffuser screen is configured to receive the plurality of pixel light beams from the 2D scanner and expand a beam width of each pixel light beam of the plurality of pixel light beams to generate a plurality of divergent pixel light beams, wherein the 2D scanner is configured to scan the plurality of pixel light beams onto the diffuser screen according to the 2D scanning pattern, wherein the diffuser screen comprises a microlens array comprising a plurality of microlenses arranged in a 2D array, wherein the plurality of microlenses comprises a first subset of microlenses each associated with a first optical path length and a second subset of microlenses each associated with a second optical path length that is different from the first optical path length, and wherein the first subset of microlenses and the second subset of microlenses are intermixed in a checkered pattern.

Aspect 25: The light beam scanning system of Aspect 24, wherein the microlens array is configured to output at least two beam components for each pair of neighboring pixel light beams, wherein an optical path difference of two neighboring microlenses of the plurality of microlenses is greater than a coherence length of the at least two beam components such that the at least two beam components do not interfere with each other.

Aspect 26: The light beam scanning system of any of Aspects 24-25, wherein the microlens array comprises a plurality of negative lens components and plurality of positive lens components that alternate with the plurality of negative lens components in a first dimension and in a second dimension of the microlens array.

Aspect 27: The light beam scanning system of Aspect 26, wherein each negative lens component of the plurality of negative lens components has a third dimension and each positive lens component plurality of positive lens components has a fourth dimension, wherein a sum of the third dimension and the fourth dimension defines a pitch of the microlens array, and wherein the beam width of each pixel light beam incident on the diffuser screen is equal to or approximately equal to the pitch of the microlens array.

Aspect 28: The light beam scanning system of Aspect 26, wherein the plurality of negative lens components are concave microlenses and the plurality of positive lens components are convex microlenses.

Aspect 29: The light beam scanning system of Aspect 26, wherein each negative lens component of the plurality of negative lens components and each positive lens component plurality of positive lens components produces a same light divergence.

Aspect 30: The light beam scanning system of any of Aspects 24-29, further comprising: a signal modulator configured to modulate the plurality of pixel light beams to remove a temporal coherence of the plurality of pixel light beams.

Aspect 31: The light beam scanning system of any of Aspects 24-30, wherein the microlens array comprises a first substrate having a first refractive index and a second substrate having a second refractive index that is different from the first refractive index, wherein the microlens array is formed from the first substrate, and wherein the second substrate comprises a plurality of recess portions and a plurality of protrusion portions that alternate with the plurality of recess portions in a first dimension and in a second dimension of the microlens array to form a 2D array structure that is matched with the 2D array of the microlens array.

Aspect 32: A system configured to perform one or more operations recited in one or more of Aspects 1-31.

Aspect 33: An apparatus comprising means for performing one or more operations recited in one or more of Aspects 1-31.

Aspect 34: A non-transitory computer-readable medium storing a set of instructions, the set of instructions comprising one or more instructions that, when executed by a device, cause the device to perform one or more operations recited in one or more of Aspects 1-31.

Aspect 35: A computer program product comprising instructions or code for executing one or more operations recited in one or more of Aspects 1-31.

The foregoing disclosure provides illustration and description, but is not intended to be exhaustive or to limit the implementations to the precise form disclosed. Modifications and variations are possible in light of the above disclosure or may be acquired from practice of the implementations.

For example, although implementations described herein relate to MEMS devices with a mirror, it is to be understood that other implementations may include optical devices other than MEMS mirror devices or other MEMS oscillating structures. In addition, although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer, or an electronic circuit.

As used herein, the term component is intended to be broadly construed as hardware, firmware, or a combination of hardware and software. It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Any of the processing components may be implemented as a central processing unit (CPU) or other processor reading and executing a software program from a non-transitory computer-readable recording medium such as a hard disk or a semiconductor memory device. For example, instructions may be executed by one or more processors, such as one or more CPUs, digital signal processors (DSPs), general-purpose microprocessors, application-specific integrated circuits (ASICs), field programmable logic arrays (FPLAs), programmable logic controller (PLC), or other equivalent integrated or discrete logic circuitry. Accordingly, the term "processor," as used herein refers to any of the foregoing structures or any other structure suitable for implementation of the techniques described herein. Software may be stored on a non-transitory computer-readable medium such that the non-transitory computer readable medium includes a program code or a program algorithm stored thereon which, when executed, causes the processor, via a computer program, to perform the steps of a method.

A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

A signal processing circuit and/or a signal conditioning circuit may receive one or more signals (e.g., measurement signals) from one or more components in the form of raw measurement data and may derive, from the measurement signal further information. Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a signal suitable for processing after conditioning.

Some implementations may be described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some implementations, a single act may include or may be broken into multiple sub acts. Such sub acts may be included and part of the disclosure of this single act unless explicitly excluded.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A light beam scanning system, comprising:
   a light transmitter configured to generate a plurality of pixel light beams corresponding to an image and transmit the plurality of pixel light beams on an optical path;
   a two-dimensional (2D) scanner arranged on the optical path, wherein the 2D scanner is configured to receive the plurality of pixel light beams from the light transmitter and steer the plurality of pixel light beams along the optical path according to a 2D scanning pattern;
   a diffuser screen arranged on the optical path downstream from the 2D scanner, wherein the diffuser screen is configured to receive the plurality of pixel light beams from the 2D scanner and expand a beam width of each pixel light beam of the plurality of pixel light beams to generate a plurality of divergent pixel light beams,
      wherein the 2D scanner is configured to scan the plurality of pixel light beams onto the diffuser screen according to the 2D scanning pattern, and
      wherein the diffuser screen comprises a microlens array comprising a plurality of microlenses arranged in a 2D array; and
   a controller configured to synchronize transmission times of the plurality of pixel light beams with a movement of the 2D scanner such that trajectories of the plurality of pixel light beams are matched with a geometry of the microlens array,
      wherein the trajectories of the plurality of pixel light beams are matched with the geometry of the microlens array such that each pixel light beam is incident on only a single microlens of the plurality of microlenses.

2. The light beam scanning system of claim 1, wherein each consecutive pixel light beam of the plurality of pixel light beams is incident on a different microlens of the plurality of microlenses.

3. The light beam scanning system of claim 1, wherein the beam width of each pixel light beam incident on the diffuser screen is smaller than a width of a microlens.

4. The light beam scanning system of claim 1, wherein the 2D scanner comprises a first scanning axis on which the 2D scanner oscillates at a first oscillation frequency and a second scanning axis on which the 2D scanner oscillates at a second oscillation frequency.

5. The light beam scanning system of claim 1, wherein the controller is configured to trigger the plurality of pixel light beams according to a transmission sequence, and
   wherein the controller is configured to skip a transmission of a pixel light beam in the transmission sequence based on an estimated trajectory of the pixel light beam being incident on two or more microlenses of the plurality of microlenses.

6. The light beam scanning system of claim 5, wherein the transmission times occur at regular intervals for the transmission sequence.

7. The light beam scanning system of claim 1, wherein the controller is configured to estimate a trajectory of each pixel light beam of the plurality of pixel light beams, and to skip a transmission of a pixel light beam based on the estimated trajectory being incident on two or more microlenses of the plurality of microlenses.

8. The light beam scanning system of claim 1, wherein the geometry of the microlens array matches the 2D scanning pattern.

9. The light beam scanning system of claim 1, wherein the diffuser screen comprises a first section comprising a first group of microlenses of the microlens array and a second section comprising a second group of microlenses of the microlens array, and wherein the first section is shifted relative to the second section such that the geometry of the microlens array matches the 2D scanning pattern.

10. The light beam scanning system of claim 1, wherein the diffuser screen is configured to produce only a single divergent pixel beam for each pixel light beam of the plurality of pixel light beams.

11. The light beam scanning system of claim 1, further comprising:

a focusing lens arranged on the optical path between the light transmitter and the diffuser screen, wherein the focusing lens is configured to receive the plurality of pixel light beams from the light transmitter and focus the plurality of pixel light beams onto the diffuser screen.

12. The light beam scanning system of claim 1, further comprising:

a head-up display (HUD) reflector configured to receive the plurality of divergent pixel light beams from the diffuser screen and reflect the plurality of divergent pixel light beams toward a field of view.

13. The light beam scanning system of claim 1, wherein the 2D scanning pattern is a Lissajous scanning pattern.

* * * * *